Patented Apr. 18, 1939

2,155,269

UNITED STATES PATENT OFFICE 2,155,269

PURIFICATION OF CAUSTIC

James L. Jamieson, Barberton, Ohio, assignor to Pittsburgh Plate Glass Company, Allegheny County, Pa., a corporation of Pennsylvania No Drawing. Application May 25, 1938, Serial No. 209,983

12 Claims. (Cl. 23—184)

This invention relates to the purification of alkali metal hydroxide and is particularly directed to the removal of sodium chloride from caustic soda liquors, such as are produced by the electrolytic-diaphragm process. Sodium hydroxide solutions as initially derived from the ordinary diaphragm type electrolytic cell, are relatively dilute solutions being in the neighborhood of from 10 to 15 percent concentration. These solutions contain up to 15 percent of sodium chloride.

Upon evaporation of these liquors, a substantial portion of the sodium chloride is crystallized out of the solution. The solubility of sodium chloride is at a minimum in sodium hydroxide solution having a concentration of approximately 45–50 percent and, in general, these solutions are evaporated to this concentration and the precipitated sodium chloride removed. It has been found, however, that for many purposes the amount of sodium chloride present in solutions of this concentration is undesirable and various elaborate and expensive processes have been resorted to in order to secure further removal of this salt.

In accordance with my invention, I have found that an alkali metal chloride, such as sodium chloride, may be removed from alkali metal hydroxide solutions, in particular, sodium hydroxide solutions in a simple manner hereinafter set forth. I have found that upon addition of a suitable soluble boron compound, such as borax, boric acid, alkali and alkaline earth metal metaborates, borates, perborates, tetraborates, hexaborates, etc., such as sodium, potassium, lithium metaborate, or tetraborate, magnesium orthoborate, diborate, etc., are added to sodium hydroxide solutions containing chloride, a substantial portion of the dissolved sodium chloride is precipitated. Very often it is found desirable to incorporate a borate of the alkaline earth metals since these compounds appear to assist in the removal of iron and other impurities, in addition to removing sodium chloride, by precipitation of alkaline earth metal hydroxides.

When the precipitated sodium chloride is removed by filtration, settling or equivalent method, the purified solution is found to be sufficiently free of sodium chloride for many purposes.

In general, I find it desirable to treat solutions approximately 40–70 percent in concentration. While solutions below this concentration may be treated in this manner, I have found that the solubility of the boron compound, which is present, is so great as to render such treatment undesirable. Treatment at concentrations in excess of 65–70 percent NaOH does not, in general, effect a sufficient reduction in salt content as may be desirable in a commercial process. The amount of the reagent required for most efficient removal of sodium chloride is dependent, to a large extent, upon the quantity of sodium chloride which is present in the liquor. In general, I use from 1 to 4 parts of soluble borate to every part of sodium chloride present. The treatment may be assisted by addition of suitable clarifying or flocculating agents in order to assist the removal of precipitated sodium chloride. Thus, I find that alkali metal oxides or hydroxides, such as lime, or dolmite, active carbon, asbestos, alpha-cellulose, etc., may be used to assist the removal of such precipitates.

The following examples illustrate the invention:

*Example I.*—To 100 parts by weight of 50 percent caustic soda solution containing 1.09 percent by weight sodium chloride was added 1.7 percent by weight of borax. The mixture was boiled for about 45 minutes and allowed to cool to room temperature and the precipitated solid product was removed by settling and filtration. The clarified liquor contained 0.23 percent sodium chloride.

*Example II.*—To 100 parts by weight of 50 percent caustic soda solution containing 0.99 percent by weight of NaCl was added 4 percent by weight borax and the mixture boiled for 30 minutes and allowed to cool.

4 percent lime was added to the liquor in order to assist the removal of the precipitated material. After clarification and filtration, the resultant liquor contained 0.24 percent sodium chloride.

Although the present invention has been described in connection with the specific details of certain embodiments thereof, it is not intended that such details shall be regarded as limitations upon the scope of the invention except insofar as included in the accompanying claims.

I claim:

1. A process of removing alkali metal chloride from an aqueous alkali metal hydroxide solution containing the same which comprises introducing a soluble boron compound into said solution whereby a substantial quantity of alkali metal chloride is precipitated and separating the precipitate from said hydroxide.

2. The process of removing sodium chloride from an aqueous sodium hydroxide solution containing the same which comprises introducing a soluble borate into said solution whereby a substantial portion of sodium chloride is precipitated and separating the precipitate from said hydroxide.

3. The process of removing sodium chloride from an aqueous solution of sodium hydroxide containing the same which comprises introducing boric acid into said solution whereby a substantial portion of sodium chloride is precipitated and separating the precipitate from said hydroxide.

4. A process of removing alkali metal chloride from an aqueous alkali metal hydroxide solution containing the same which comprises introducing borax into said solution whereby a substantial quantity of alkali metal chloride is precipitated and separating the precipitate from said hydroxide.

5. The process of removing alkali metal chloride from an aqueous solution of alkali metal hydroxide containing the same which comprises introducing boric acid into said solution whereby a substantial portion of alkali metal chloride is precipitated and separating the precipitate from said hydroxide.

6. Process of removing sodium chloride from an aqueous sodium hydroxide solution containing the same which comprises introducing borax into said solution whereby a substantial quantity of sodium chloride is precipitated and separating the precipitate from said hydroxide.

7. A process of removing sodium chloride from aqueous sodium hydroxide solution containing the same which comprises introducing a soluble boron compound to a solution having a sodium hydroxide concentration of 40–70 percent whereby a substantial proportion of the sodium chloride dissolved therein is precipitated and separating the precipitate from said hydroxide.

8. A process of removing sodium chloride from aqueous sodium hydroxide solution containing the same which comprises introducing borax to a solution having a sodium hydroxide concentration of 40–70 percent whereby a substantial proportion of the sodium chloride dissolved therein is precipitated and separating the precipitate from said hydroxide.

9. A process of removing sodium chloride from aqueous sodium hydroxide solution containing the same which comprises introducing boric acid to a solution having a sodium hydroxide concentration of 40–70 percent whereby a substantial proportion of the sodium chloride dissolved therein is precipitated and separating the precipitate from said hydroxide.

10. A process of removing alkali metal chloride from aqueous alkali metal hydroxide solution containing the same which comprises introducing a soluble boron compound to a solution having an alkali metal hydroxide concentration of 40–70 percent whereby a substantial proportion of the alkali metal chloride dissolved therein is precipitated and separating the precipitate from said hydroxide.

11. A process of removing alkali metal chloride from aqueous alkali metal hydroxide solution containing the same which comprises introducing borax to a solution having an alkali metal hydroxide concentration of 40–70 percent whereby a substantial proportion of the alkali metal chloride dissolved therein is precipitated and separating the precipitate from said hydroxide.

12. A process of removing alkali metal chloride from aqueous alkali metal hydroxide solution containing the same which comprises adding boric acid to a solution having an alkali metal hydroxide concentration of 40–70 percent whereby a substantial proportion of the alkali metal chloride dissolved therein is precipitated and separating the precipitate from said hydroxide.

JAMES L. JAMIESON.